United States Patent
Nelson et al.

(10) Patent No.: US 12,406,067 B2
(45) Date of Patent: Sep. 2, 2025

(54) ENABLING UEFI SECURE BOOT KEY VARIABLE EXTENSIONS TO ACCOMMODATE CUSTOM SECURE BOOT KEYS

(71) Applicant: Dell Products L.P., Round Rock, TX (US)

(72) Inventors: Amy Christine Nelson, Round Rock, TX (US); Ibrahim Sayyed, Georgetown, TX (US); Nicholas D. Grobelny, Evergreen, CO (US)

(73) Assignee: Dell Products L.P., Round Rock, TX (US)

( * ) Notice: Subject to any disclaimer, the term of this patent is extended or adjusted under 35 U.S.C. 154(b) by 76 days.

(21) Appl. No.: 18/424,661

(22) Filed: Jan. 26, 2024

(65) Prior Publication Data
US 2025/0245338 A1 Jul. 31, 2025

(51) Int. Cl.
G06F 21/57 (2013.01)

(52) U.S. Cl.
CPC .................. G06F 21/575 (2013.01)

(58) Field of Classification Search
CPC ..................................... G06F 21/575
See application file for complete search history.

(56) References Cited

U.S. PATENT DOCUMENTS

| | | | |
|---|---|---|---|
| 2005/0091522 A1* | 4/2005 | Hearn | G06F 21/575 726/26 |
| 2019/0163911 A1* | 5/2019 | Kliewer | H04L 9/30 |
| 2023/0021213 A1* | 1/2023 | Sayyed | G06F 21/31 |
| 2023/0168901 A1* | 6/2023 | Hung | G06F 9/4406 713/2 |
| 2024/0330468 A1* | 10/2024 | Bower, III | G06F 21/572 |

FOREIGN PATENT DOCUMENTS

WO WO-2022266490 A1 * 12/2022

\* cited by examiner

*Primary Examiner* — Zahid Choudhury
(74) *Attorney, Agent, or Firm* — Jackson Walker L.L.P.

(57) ABSTRACT

A disclosed method for provisioning an information handling system includes accessing a custom certificate database (CCD) including one or more certificates corresponding to one or more custom firmware features and generating a custom db variable for the CCD, which is subordinate to a default OEM db variable for the CCD. The custom db variable may be provided to a system BIOS residing in an SPI flash device. Responsive to the BIOS validating the custom db variable against a Secure Boot platform key, the custom db variable may be stored to a second NVM device. The custom db variable may be injected into a default Secure Boot db variable residing on the SPI flash. Prior to executing any of the one or more custom firmware features associated with the CCD, the custom db variable is verified with a certificate residing in the SPI flash.

20 Claims, 2 Drawing Sheets

ENABLING UEFI SECURE BOOT KEY VARIABLE EXTENSIONS TO ACCOMMODATE CUSTOM SECURE BOOT KEYS

TECHNICAL FIELD

The present disclosure pertains to information handling system security and, more specifically, features for ensuring firmware integrity.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The proper and intended functionality of many information handling systems begins with a basic input/output system (BIOS) and other platform-specific firmware, which is typically stored in a nonvolatile memory device. In a pervasive example referenced in the detailed description to follow, the primary firmware storage resource is implemented as a flash memory chip coupled to a system's one or more central processing units (CPUs) via a Serial Peripheral Interface (SPI) bus. Although variously referred to as the BIOS SPI flash chip, BIOS flash chip, SPI flash chip, BIOS flash, SPI flash, and derivations and combinations thereof, this disclosure will use the term SPI flash for the sake of brevity and consistency. Because the SPI flash is frequently a capacity constrained resource, an information handling system original equipment manufacturer (OEM) may decide to move the storage of one or more OEM firmware-based features off of the BIOS SPI flash and onto another, preferably less costly, persistent storage device, such as a hard disk drive (HDD), a Nonvolatile Memory Express (NVMe) or other type of solid state drive (SSD), or another suitable persistent storage resource.

Moving BIOS code off of the BIOS flash impacts firmware code integrity measurements and trust chaining features that may be invoked when secure mode operation is enabled. Secure mode operation is designed to ensure that BIOS and other firmware executed during the Unified Extensible Firmware Interface (UEFI) specification encompasses a secure operation mode referred to as Secure Boot. Secure Boot requires that system BIOS code executed off SPI flash must be signed and verified in accordance with UEFI's Secure Boot provisions, whereas BIOS code execution from the flash chip utilizes integrated firmware integrity checks, e.g., trust chaining anchored to an OEM's root of trust. In a conventional UEFI implementation, cryptographic keys used to digitally sign a firmware feature for code integrity verification must reside in a Secure Boot database to enable BIOS to verify the feature image prior to execution. Default Secure Boot keys may be included in the Secure Boot database using various mechanisms, such as being prebuilt into the BIOS image during production, utilizing a signed update via the operating system, or by manually inserting the keys into the database using some form of UEFI-compliant custom key management. The Secure Boot framework complicates the deployment of custom firmware-based enhancements because customers developing enhanced features generally require the use of their own custom key databases and integrating additional keys into the Secure Boot structure is difficult to do in a secure manner.

SUMMARY

Problems associated with accommodating custom firmware features within a rigidly specified and resource-constrained secure mode framework, such as UEFI Secure Boot, are addressed by methods and systems disclosed herein. Disclosed subject matter supports customization of the Secure Boot default database without requiring a BIOS firmware update, while addressing storage capacity issues associated with the use of SPI flash for storing Secure Boot databases and without mandating larger capacity SPI flash devices. SPI flash capacity issues will only increase with each new vulnerability disclosure potentially requiring the storage of additional keys and hashes in the UEFI restricted database (dbx).

Enabling Secure Boot database customization beneficially supports and encourages OEM development of firmware-based feature enhancements while also providing OEM customers with a scalable solution for enabling their customer-specific feature enhancement including enhancements supported by the OEM through strategic partnerships.

Disclosed features for supporting scalable Secure Boot key variable extension to accommodate and manage custom secure boot keys provide trusted loading of UEFI firmware into system memory verified against OEM and/or customer provided extended keys. In at least some embodiments, disclosed systems and methods provide a UEFI Secure Boot key management process that allows secure installation of custom Secure Boot keys linked to the Secure Boot database and further provide a Secure Boot certificate variable customization extension process. Disclosed customization processes allow customers and/or OEMs to selectively include feature specific custom Secure Boot keys into their own key databases. Disclosed subject matter also supports customization of customer/OEM default databases based on feature enhancements.

The present invention enables external customers to execute proprietary UEFI firmware features stored off of the SPI flash using a customer provided secure boot database for feature verification. This enables OEM customers to securely run their pre-boot applications, OS boot loaders and other custom software on OEM hardware.

Elements and resources supporting disclosed features include, without limitation, a linked Secure Boot dB variable located off of the SPI flash which can be verified using secure boot keys that are stored on the SPI flash; a mechanism to ensure that the integrity of the linked variable is verifiable using a customer's secure boot key which is endorsed by (chained to) the Secure Boot platform key's trust; a mechanism to sign (endorse) a custom Secure Boot key used to verify the integrity of the linked variable; and a mechanism to enumerate and discover UEFI variables stored off the SPI flash.

In at least one aspect, disclosed subject matter teaches a method for provisioning an information handling system wherein the method includes accessing a custom certificate database (CCD) including one or more certificates corresponding to one or more custom firmware features and generating a custom db variable for the CCD, wherein the custom db variable is subordinate to a db variable associated with the OEM. The custom db variable may be provided to a system BIOS, which may reside in a first NVM device, e.g., the SPI flash. Responsive to the BIOS validating the custom db variable against a Secure Boot platform key, the custom db variable may be stored to a second NVM device, which is distinct from the first NVM device in at least some embodiments. The custom db variable may be injected into a recognized or default Secure Boot db variable residing on the first NVM device. Prior to executing any of the one or more custom firmware features associated with the CCD, the custom db variable is verified with a certificate residing in the first NVM device.

Generating the custom db variable may include generating a first signed custom database payload by signing the CCD with a first key, wherein the first key is associated with a manufacturer of the information handling system, and generating a second signed custom database payload by signing the first custom database payload with a second key. The second key may be associated with a platform of the information handling system, e.g., a UEFI Secure Boot platform key. The first key may comprise a private key of an OEM UEFI Secure Boot key pair while the second key may comprises a private key of a UEFI Secure Boot platform key pair.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
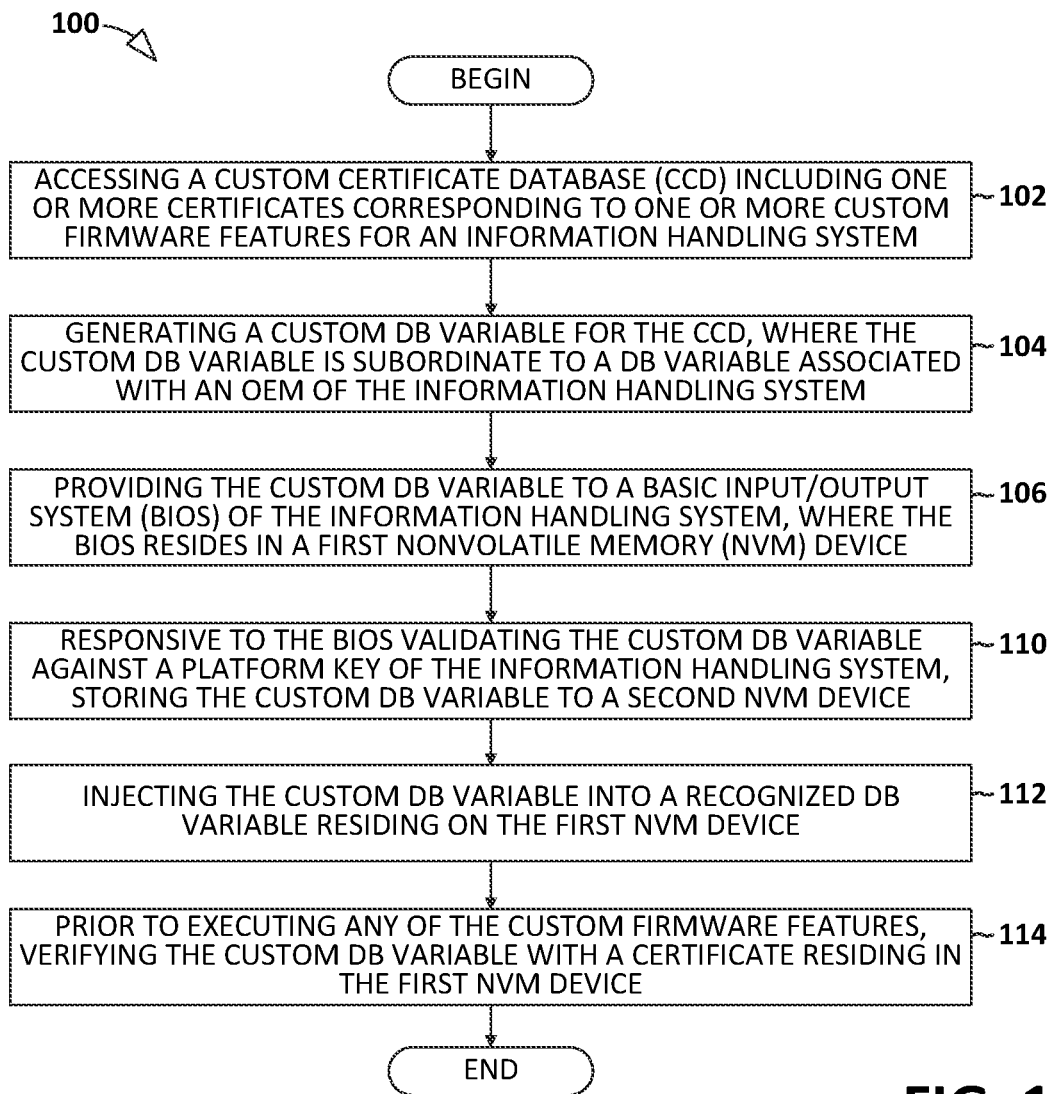
FIG. 1 is a flow diagram depiction of a scalable method for accommodating custom Secure Boot key variable extensions.
Figure 2:
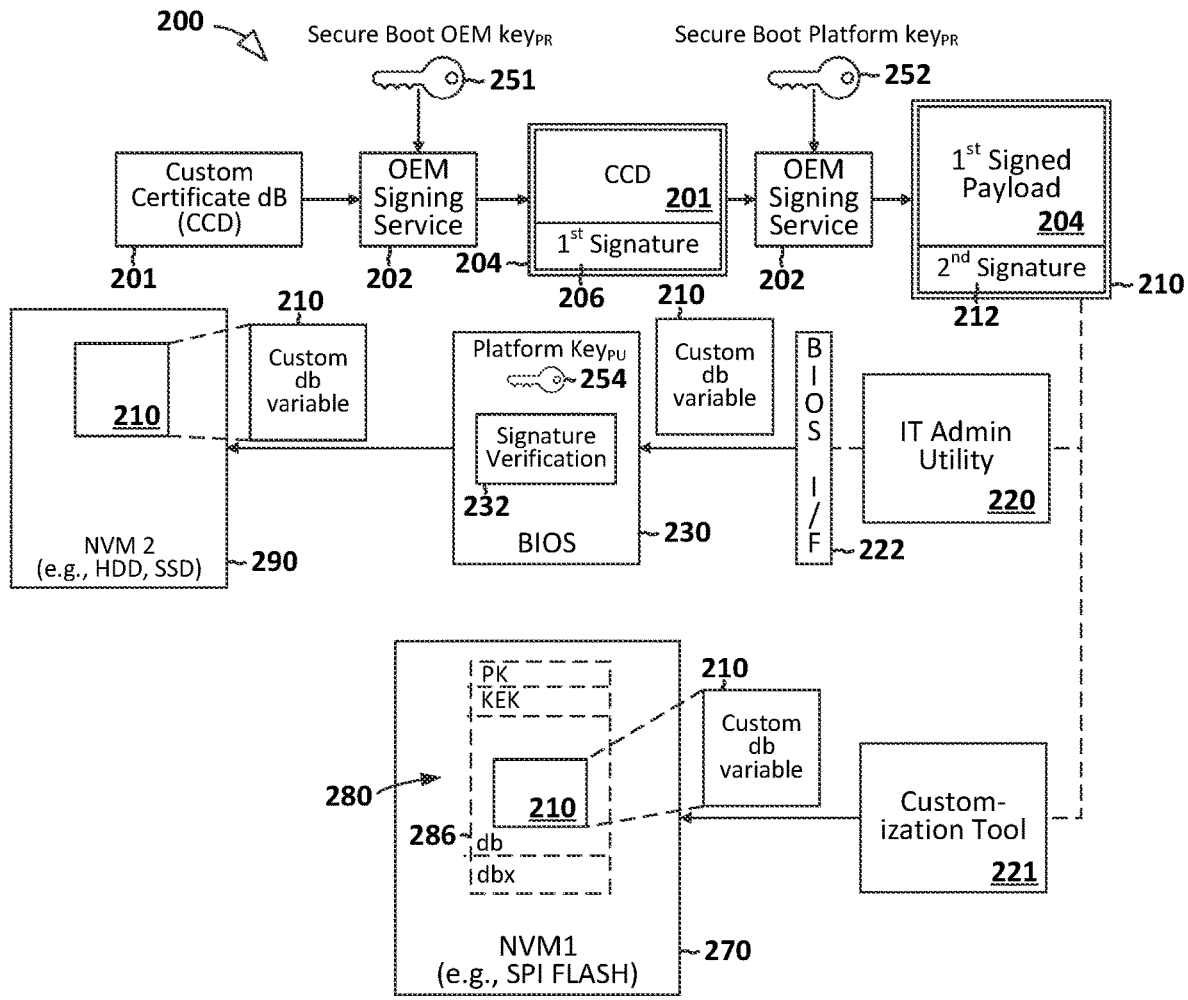
FIG. 2 illustrates an exemplary implementation of the method depicted in FIG. 1.
Figure 3:
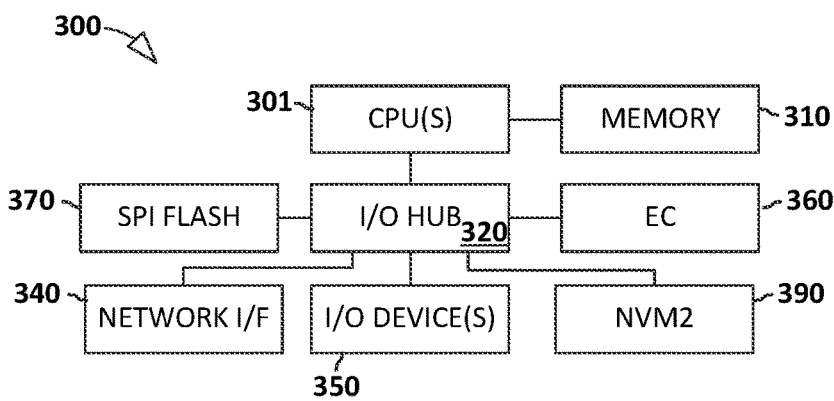
FIG. 3 depicts an exemplary information handling system suitable for implementing features disclosed in FIG. 1 and FIG. 2

Exemplary embodiments and their advantages are best understood by reference to FIGS. 1-3, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates a method 100 for provision of an information handling system to accommodate custom Secure Boot keys corresponding to custom firmware features in accordance with the present invention. At least some of the operations of method 100 may be performed by the information handling system OEM. The method 100 depicted in FIG. 1 begins when a custom certificate database (CCD) is received, obtained, or otherwise accessed (operation 102) by the OEM. In at least some embodiments, the CCD includes one or more verification certificates corresponding to one or more custom firmware features. Such custom firmware features may include firmware features, such as custom pre-boot applications, custom operating system boot loaders, etc., developed by a strategic partner of the OEM.

As depicted in FIG. 1, a custom db variable for the CCD is generated (operation 104). In at least some embodiments, the custom db variable is a Secure Boot db variable that is subordinate to a Secure Boot db variable of the OEM. An implementation of method 100, depicted in FIG. 2 and described in the accompanying description, illustrates an exemplary process for generating the custom db variable.

The custom db variable may then be provided (operation 106) to system BIOS stored in and executing from the system's SPI Flash. In at least some embodiments, operation 106 may be performed with the aid of an information technology administration (IT admin) utility utilizing a suitable BIOS interface. As an example in which Dell Technologies is the information handling system OEM, operation 106 may be performed using a suitable management utility or firmware update utility to access embedded controller (EC) memory mapped I/O (MMIO) functionality. If the BIOS successfully validates the custom db variable against the system's Secure Boot platform key, the custom db variable may be stored (operation 110) to a second NVM device such as an HDD, SSD, etc. of the system.

The custom db variable may then be injected (operation 112) into a recognized secure mode db variable such as the OEM Secure Boot db variable residing on the SPI flash. Prior to executing any of the custom firmware features associated with the custom db variable, the custom db variable is verified (operation 114) with a certificate residing in the OEM db variable on the SPI flash.

Referring now to FIG. 2, a method 200, comprising an exemplary implementation of the method 100 of FIG. 1, is presented. As depicted in FIG. 2, an OEM's digital signing service 202 is used in conjunction with an OEM's Secure Boot private key 251 to digitally sign CCD 201, which contains certificates (not explicitly depicted) for one or more custom firmware features. The signing of CCD 201 produces a first signed payload 204 comprised of CCD 201 and a first signature 206 generated by OEM signing service 202.

As depicted in FIG. 2, first signed payload 204 is then digitally signed with the system's private Secure Boot Platform key 252 by OEM signing service 202 to produce a second signed payload 210. The second signed payload 210 illustrated in FIG. 2 includes first signed payload 204 and a second signature 212 generated by OEM signing service 202 based on first signed payload 204 and Secure Boot Platform private key 252. Because second signed payload 210 corresponds to the custom db variable referred to in the description of FIG. 1, second signed payload 210 may be alternatively referred to herein as custom db variable 210.

FIG. 2 further illustrates an IT admin utility 220 invoking a BIOS interface 222 to provide custom db variable 210 to BIOS 230. As depicted, BIOS 230 invokes a signature verification algorithm 232 to verify custom db variable 210 against the Secure Boot Platform public key 254. Following a successful verification of custom db variable 210, BIOS 230 may be configured to recognize or otherwise determine, based at least in part on the presence of first signature 206 within custom db variable 210, that custom db variable 210 is subordinate to the system's OEM Secure Boot variable. In at least some embodiments, BIOS 230 may respond to recognizing custom db variable 210 as a subordinate db variable, by storing custom db variable 210 in an off-SPI location such as the NVM storage identified in FIG. 2 as NVM2 290.

FIG. 2 still further illustrates a customization tool 221 injecting custom db variable 210 into a Secure Boot db variable 286 in a UEFI Secure Boot database 280 on SPI flash 270. Prior to executing any custom feature associated with custom db variable 210, custom db variable 210 is verified against a custom signature, certificate, or key residing in NVM1.

Although FIG. 2 depicts a specific implementation, embodiments may include additional and/or different features than depicted in FIG. 2. As a non-limiting example, while FIG. 2 depicts an implementation featuring an OEM db variable, on the SPI flash, which contains keys usable to cryptographically verify a custom Secure Boot db variable on an HDD, SSD, or the like, another implementation may employ a single Secure Boot linked variable, split into two parts that are cryptographically linked.

Referring now to FIG. 3, any one or more of the elements illustrated in FIG. 1 and FIG. 2 may be implemented as or within an information handling system exemplified by the information handling system 300 illustrated in FIG. 3. The illustrated information handling system includes one or more general purpose processors or central processing units (CPUs) 301 communicatively coupled to a memory resource 310 and to an input/output hub 320 to which various I/O resources and/or components are communicatively coupled. The I/O resources explicitly depicted in FIG. 3 include an SPI flash 370 suitable for use as the NVM1 270 of FIG. 2, network interface 340, commonly referred to as a NIC (network interface card), a nonvolatile storage resource 390, suitable for use as the NVM2 290 of FIG. 2, and additional I/O devices, components, or resources 350 including as non-limiting examples, keyboards, mice, displays, printers, speakers, microphones, etc. The illustrated information handling system 300 includes an embedded controller EC 360 may provide or support various system management functions and, in at least some implementations, keyboard controller functions. Exemplary system management functions that may be supported by EC 360 include thermal management functions supported by pulse width modulation (PWM) interfaces suitable for controlling system fans, power monitoring functions supported by an analog-to-digital (ADC) signal that can be used to monitor voltages and, in conjunction with a sense resistor, current consumption per power rail. This information could be used to, among other things, monitor battery charging or inform the user or administrator of potentially problematic power supply conditions. EC 360 may support battery management features to control charging of the battery in addition to switching between the battery and AC adapter as the active power source changes or monitoring the various battery status metrics such as temperature, charge level and overall health. EC 360 may support an Advanced Configuration and Power Interface (ACPI) compliant OS by providing status and notifications regarding power management events and by generating wake events to bring the system out of low power states.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for provisioning an information handling system, the method comprising:
    accessing a custom certificate database (CCD) including one or more certificates corresponding to one or more custom firmware features;
    generating a custom db variable for the CCD, wherein the custom db variable is subordinate to a db variable associated with an original equipment manufacturer (OEM) of the information handling system;
    providing the custom db variable to a basic input/output system (BIOS) of the information handling system, wherein the BIOS resides in a first nonvolatile memory (NVM) device;
    responsive to the BIOS validating the custom db variable against a default platform key of the information handling system, storing the custom db variable to a second NVM device;
    injecting the custom db variable into a secure boot db variable residing on the first NVM device; and
    prior to executing any of the one or more custom firmware features, verifying the custom db variable with a certificate residing in the first NVM device.

2. The method of claim 1, wherein the first and second NVM devices are distinct devices.

3. The method of claim 2, wherein the first NVM device comprises a flash memory device coupled to a Serial Peripheral Interface (SPI) bus of the information handling system.

4. The method of claim 3, wherein the second NVM device is selected from a solid state storage device and a hard disk drive.

5. The method of claim 3, wherein the second NVM device comprises a NVM Express (NVMe) storage device.

6. The method of claim 1, wherein generating the custom db variable for the CCD comprises:
    generating a first signed custom database payload by signing the CCD with a first key, wherein the first key is associated with a manufacturer of the information handling system; and
    generating a second signed custom database payload by signing the first custom database payload with a second key, wherein the second key is associated with a platform of the information handling system.

7. The method of claim 6, wherein the first key comprises a private key of a UEFI Secure Boot key pair associated with the manufacturer.

8. The method of claim 6, wherein the second key comprises a private key of a UEFI Secure Boot key pair for the platform.

9. The method of claim 1, wherein the recognized db variable comprises a UEFI Secure Boot variable.

10. The method of claim 1, wherein the one or more custom firmware features include at least one feature selected from: a custom pre-boot application and a custom boot loader for an operating system.

11. An information handling system, comprising:
    a central processing unit (CPU);
    a system memory including processor executable instructions that, when executed by the CPU, cause the system to perform operations including:
        accessing a custom certificate database (CCD) including one or more certificates corresponding to one or more custom firmware features;
        generating a custom db variable for the CCD, wherein the custom db variable is subordinate to a db variable associated with an original equipment manufacturer (OEM) of the information handling system;
        providing the custom db variable to a basic input/output system (BIOS) of the information handling system, wherein the BIOS resides in a first nonvolatile memory (NVM) device;
        responsive to the BIOS validating the custom db variable against a default platform key of the information handling system, storing the custom db variable to a second NVM device;
        injecting the custom db variable into a secure boot db variable residing on the first NVM device; and
        prior to executing any of the one or more custom firmware features, verifying the custom db variable with a certificate residing in the first NVM device.

12. The information handling system of claim 11, wherein the first and second NVM devices are distinct devices.

13. The information handling system of claim 12, wherein the first NVM device comprises a flash memory device coupled to a Serial Peripheral Interface (SPI) bus of the information handling system.

14. The information handling system of claim 13, wherein the second NVM device is selected from a solid state storage device and a hard disk drive.

15. The information handling system of claim 13, wherein the second NVM device comprises a NVM Express (NVMe) storage device.

16. The information handling system of claim 11, wherein generating the custom db variable for the CCD comprises:
   generating a first signed custom database payload by signing the CCD with a first key, wherein the first key is associated with a manufacturer of the information handling system; and
   generating a second signed custom database payload by signing the first custom database payload with a second key, wherein the second key is associated with a platform of the information handling system.

17. The information handling system of claim 16, wherein the first key comprises a private key of a UEFI Secure Boot key pair associated with the manufacturer.

18. The information handling system of claim 16, wherein the second key comprises a private key of a UEFI Secure Boot key pair for the platform.

19. The information handling system of claim 11, wherein the recognized db variable comprises a UEFI Secure Boot variable.

20. The information handling system of claim 11, wherein the one or more custom firmware features include at least one feature selected from: a custom pre-boot application and a custom boot loader for an operating system.

* * * * *